United States Patent
Lin et al.

(10) Patent No.: US 8,275,254 B2
(45) Date of Patent: Sep. 25, 2012

(54) CAMERA MODULE AND METHOD FOR ASSEMBLING THE SAME

(75) Inventors: Ming-Yuan Lin, Taipei Hsien (TW); Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 61 days.

(21) Appl. No.: 12/981,583

(22) Filed: Dec. 30, 2010

(65) Prior Publication Data
US 2011/0311214 A1    Dec. 22, 2011

(30) Foreign Application Priority Data
Jun. 21, 2010  (TW) ................................ 99120080 A

(51) Int. Cl.
*G03B 17/02*    (2006.01)
(52) U.S. Cl. ...................................................... 396/535
(58) Field of Classification Search ................... 396/529, 396/535, 542
See application file for complete search history.

(56) References Cited

U.S. PATENT DOCUMENTS

| 7,990,460 | B2 * | 8/2011 | Wenstrand et al. ........... 348/349 |
| 2005/0219398 | A1 * | 10/2005 | Sato et al. ..................... 348/340 |
| 2011/0311213 | A1 * | 12/2011 | Lin ................................ 396/529 |
| 2011/0311214 | A1 * | 12/2011 | Lin et al. ...................... 396/535 |

* cited by examiner

*Primary Examiner* — W. B. Perkey
(74) *Attorney, Agent, or Firm* — Altis Law Group, Inc.

(57) ABSTRACT

A camera module includes a lens assembly and a baseboard assembly mounted on the lens assembly. The lens assembly includes a lens, a barrel receiving the lens, and a support member receiving the barrel. The baseboard assembly includes a circuit board and an image sensor on the circuit board. The baseboard defines a friction surface at a side surface thereof.

10 Claims, 6 Drawing Sheets

CAMERA MODULE AND METHOD FOR ASSEMBLING THE SAME

BACKGROUND

1. Technical Field

The present disclosure relates generally to camera modules, and especially to a camera module and method for assembling the same.

2. Description of Related Art

A commonly used camera module generally includes a lens assembly and a baseboard assembly mounted on the lens assembly. In assembly, a fixture may be employed for moving the lens assembly on the baseboard assembly, so that the base assembly and the lens assembly can be packaged together. However, manufacturing errors of the lens assembly or baseboard assembly, or positioning errors of the lens assembly can restrict the lens assembly from being accurately fixed on the baseboard assembly in a specific position, resulting in low image quality.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the views.

DETAILED DESCRIPTION

Figure 1:
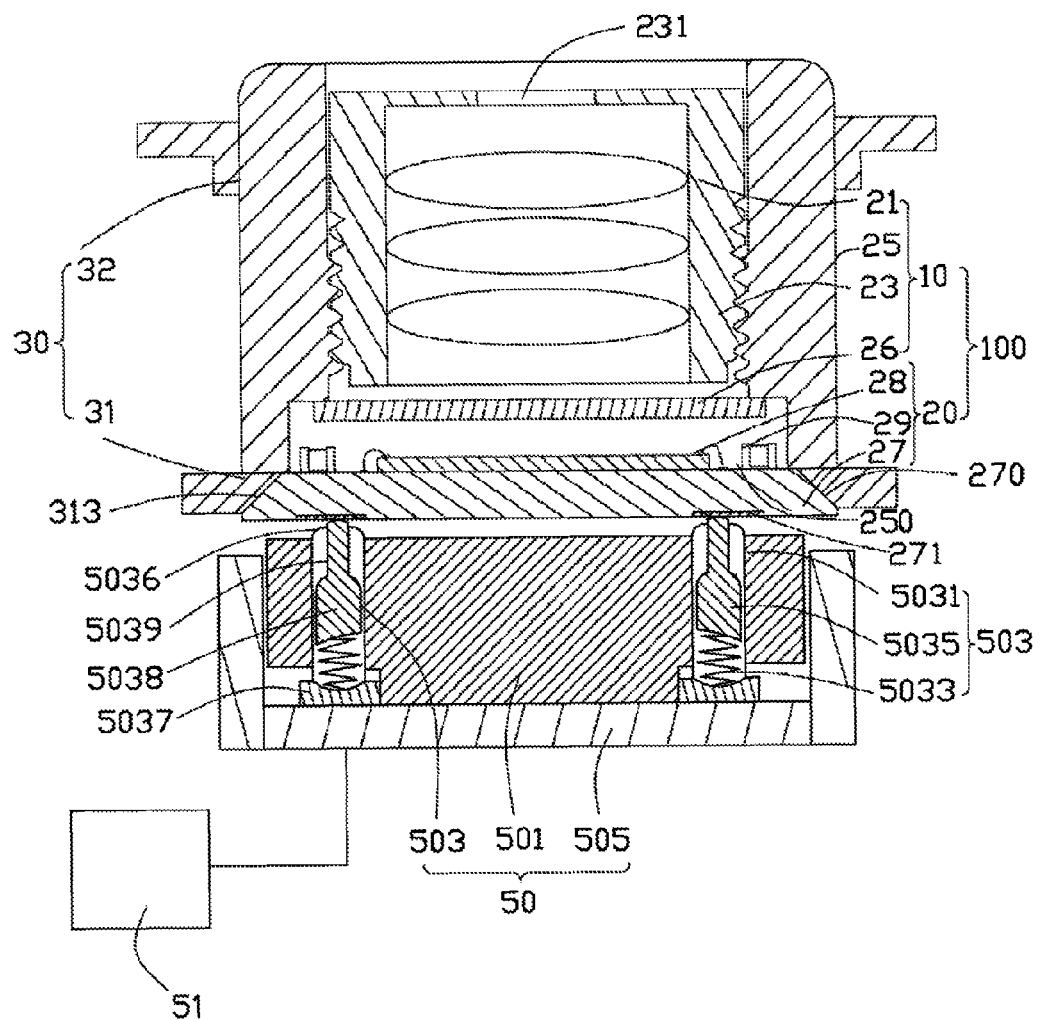
FIG. 1 is a cross section of a first embodiment of a camera module.

Referring to FIG. 1, an embodiment of a camera module 100 includes a lens assembly 10 and a baseboard assembly 20. The lens assembly 10 includes a lens 21, a barrel 23 receiving the lens 21, a support member 25 for receiving the barrel 23, and a filter 26. The barrel 23 defines a light hole 231 at an end. The support member 25 defines a receiving chamber 250 at an end for receiving the filter 26. The filter 26 is mounted in the receiving chamber 250. The barrel 23 defines an outer thread (not labeled) at an outer surface thereof; and the support member 25 defines an inner thread (not labeled) corresponding to the outer thread of the barrel 23. The barrel 23 is mounted in the support member 25 by threaded engagement, and the filter 26 faces the light hole 231 of the barrel 23, receiving light from the light hole 231. The baseboard assembly 20 includes a baseboard 27, an image sensor 28 at a surface of the baseboard 27, and two electrical members 29. The two electrical members 29 are arranged on the baseboard 27 on both sides of the image sensor 28 respectively, and electrically connected to the baseboard 27 by a cable (not labeled). The baseboard 27 includes a pair of contact sheets 271 at a surface away from the image sensor 28. The contact sheets 271 connect to a display device 51. In the illustrated embodiment, the electrical member 29 is an electrical resistor. Alternatively, the electrical member 29 may be a capacitor or inductor, for enhancing a function of the baseboard assembly 20. The baseboard assembly 20 is mounted at an end of the barrel 23, adjacent to the filter 26, and the image sensor 28 and the electrical members 29 are fixed in the receiving chamber 250. Light from the light hole 231 passes through the lens 21, the filter 26, and finally incident upon the image sensor 28, forming an image. Infrared light may be blocked by the filter 26, thus image quality can be improved. The baseboard 27 defines an angled friction surface 270 at a side surface, with a width of the baseboard 27 decreasing toward the image sensor 28.

Figure 2:
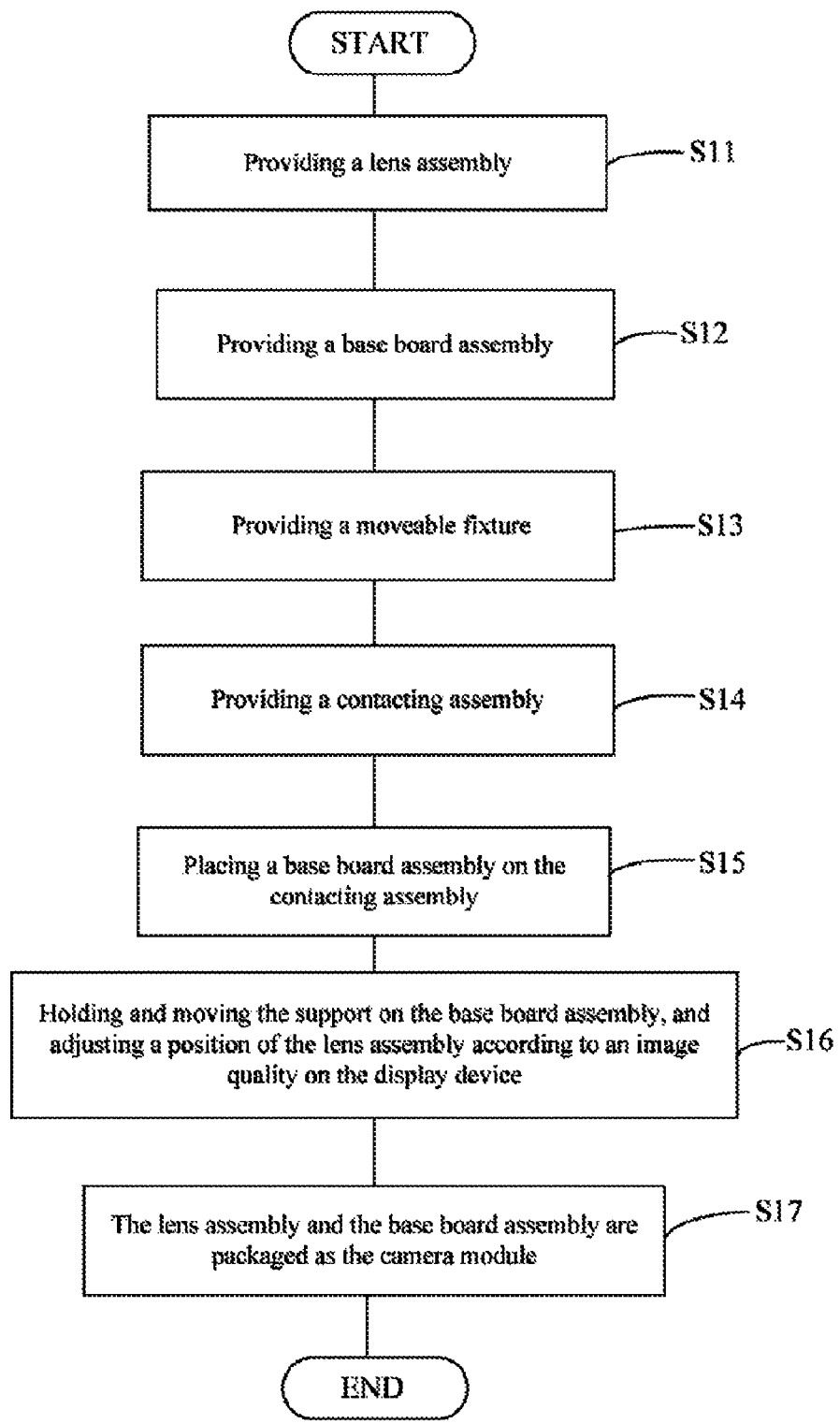
FIG. 2 is a flowchart of a method for assembling the camera module of FIG. 1.

Also referring to FIG. 2, a method for assembling the camera module 100 includes the steps below.

In a first step S11, a lens assembly 100 is provided.

In a second step S12, a baseboard assembly 20 is provided, defining an angled friction surface 270.

In a third step S13, a moveable fixture 30 is provided. In the illustrated embodiment, the moveable fixture 30 includes a first clamping member 31 and a second clamping member 32. The first clamping member 32 defines a clamping surface 313 corresponding to the friction surface 270 for holding the baseboard 27.

In a fourth step S14, a contact assembly 50 and the display device 51 are provided. The contact assembly 50 includes a main body 501, a pair of probes 503, and a circuit board 505. The main body 501 is fixed on the circuit board 505. Each probe 503 includes a sleeve 5031, a spring 5033 in the sleeve 5031, and a head 5035. The sleeve 5031 is fixed in the main body 501, with both ends of the sleeve 5031 extending out of the main body 501. The sleeve 5031 forms a limiting portion 5036 at an end away from the circuit board 505, and forms a connecting portion 5037 covering the sleeve 5031 at the other end. The probe 5035 includes a fixing portion 5038 and a contact portion 5039. A diameter of the fixing portion 5038 is substantially equal to an inner diameter of the sleeve 5031, and a diameter of the contact portion 5039 is less than that of the fixing portion 5038. An end of the spring 5033 is fixed at an end of the fixing portion 5038 away from the contact portion 5039, and the other end of the spring 5033 is fixed on the connecting portion 5037. The spring 5033 resists the probe 5035, to impel the contact portion 5039 through the limiting portion 5036, and partially extending out of the sleeve 5031. The fixing portion 5038 is blocked by the limiting portion 5036, thus the fixing portion 5038 is capable of sliding in the sleeve 5031 and compressing the spring 5033, but cannot detach from the sleeve 5031. The circuit board 505 is connected to the display device 51 by a cable (not labeled).

In the fifth step S15, the baseboard assembly 20 is held and moved by the first clamping member 31 and placed on the contact assembly 50, and each probe 5035 contacts one contact sheet 271. The clamping surface of the first clamping member 31 contacts the friction surface 270 for securing and moving the baseboard 27 to a predetermined position to prevent unwanted movement of the baseboard 27.

In the sixth step 16, the support member 25 is held and moved by the second clamping member 32. Light from the light hole 231 passes through the filter 26, and is incident upon the image sensor 28. The image sensor 28 converts optical signals of the light into electrical signals, and the electrical signals are transmitted to the display device 51 via the baseboard 27, the probes 503, and the contact assembly 50. A position of the lens assembly 10 relative to the image sensor 28 can be adjusted by the first clamping member 31 and the second clamping member 32 according to an image quality on the display device 50, to mount the lens assembly 10 properly, thus improving the image quality. The baseboard 27 may be mounted on the support member 25 by surface mount technology.

In the seventh step S17, the lens assembly 10 and the baseboard assembly 20 are packaged as the camera module 100.

Figure 3:
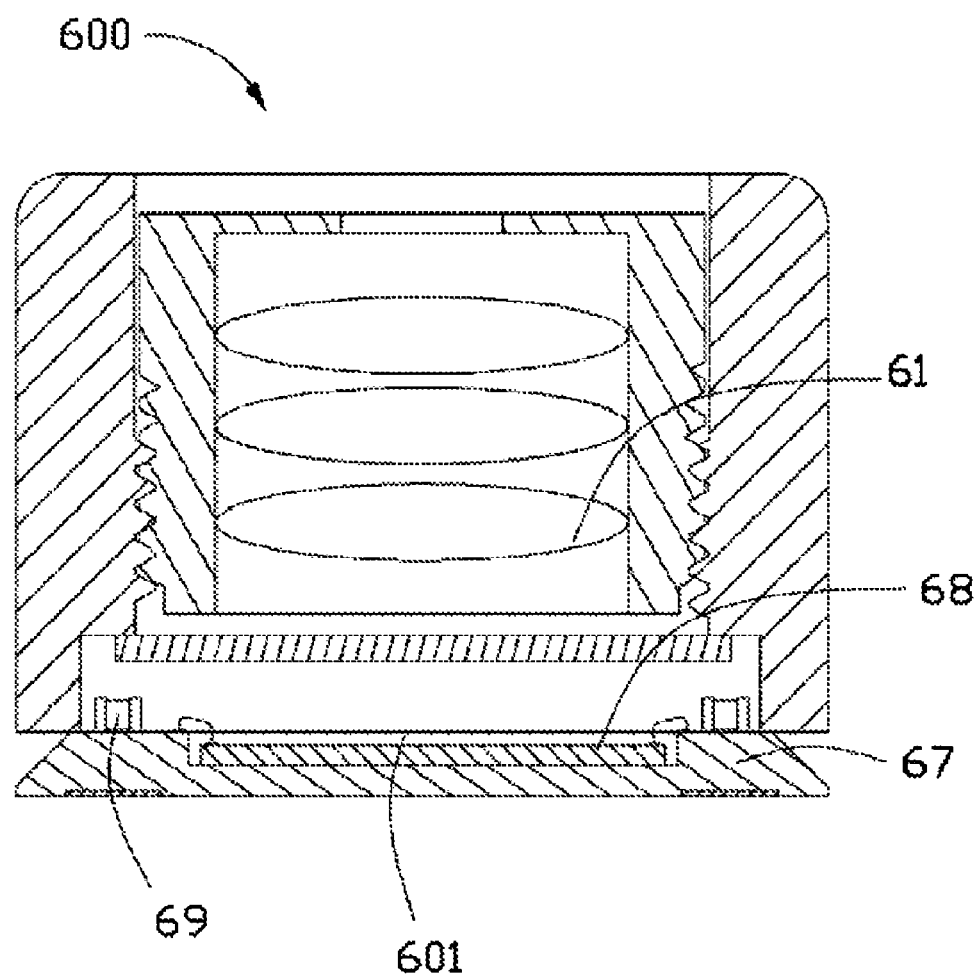
FIG. 3 is a cross section of a second embodiment of a camera module.

FIG. 3 shows a second embodiment of a camera module 600, differing from the first embodiment of the camera module 100 only in the inclusion of a receiving chamber 601 defined on a baseboard 67 for receiving an image sensor 68, to reduce a height of the camera module 600.

Figure 4:
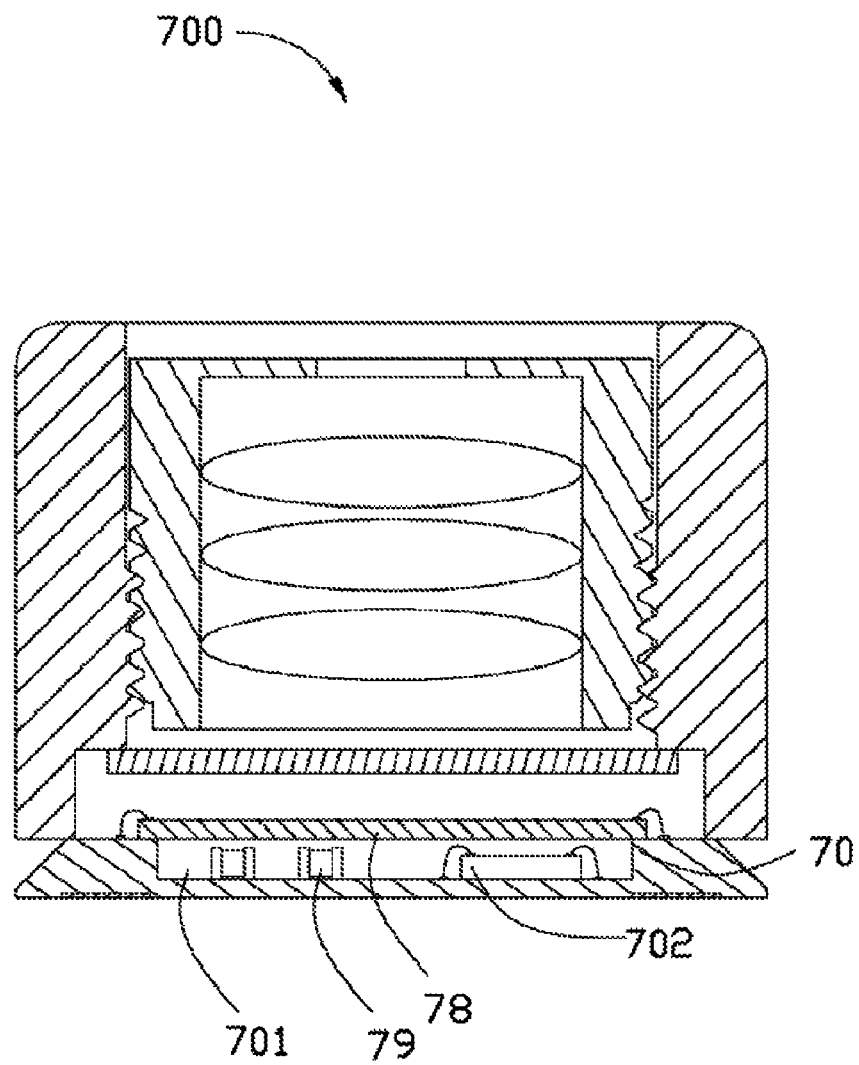
FIG. 4 is a cross section of a third embodiment of a camera module.

FIG. 4 shows a third embodiment of a camera module 700, differing from the second embodiment of the camera module 600 only in the inclusion of an integrated circuit 702 for adding supplementary function thereto and the position of the image sensor 78. The image sensor 78 covers the receiving chamber 701. The electrical member 79 and the integrated circuit 702 are positioned in the receiving chamber 701, reducing the height of the camera module 700.

Figure 5:
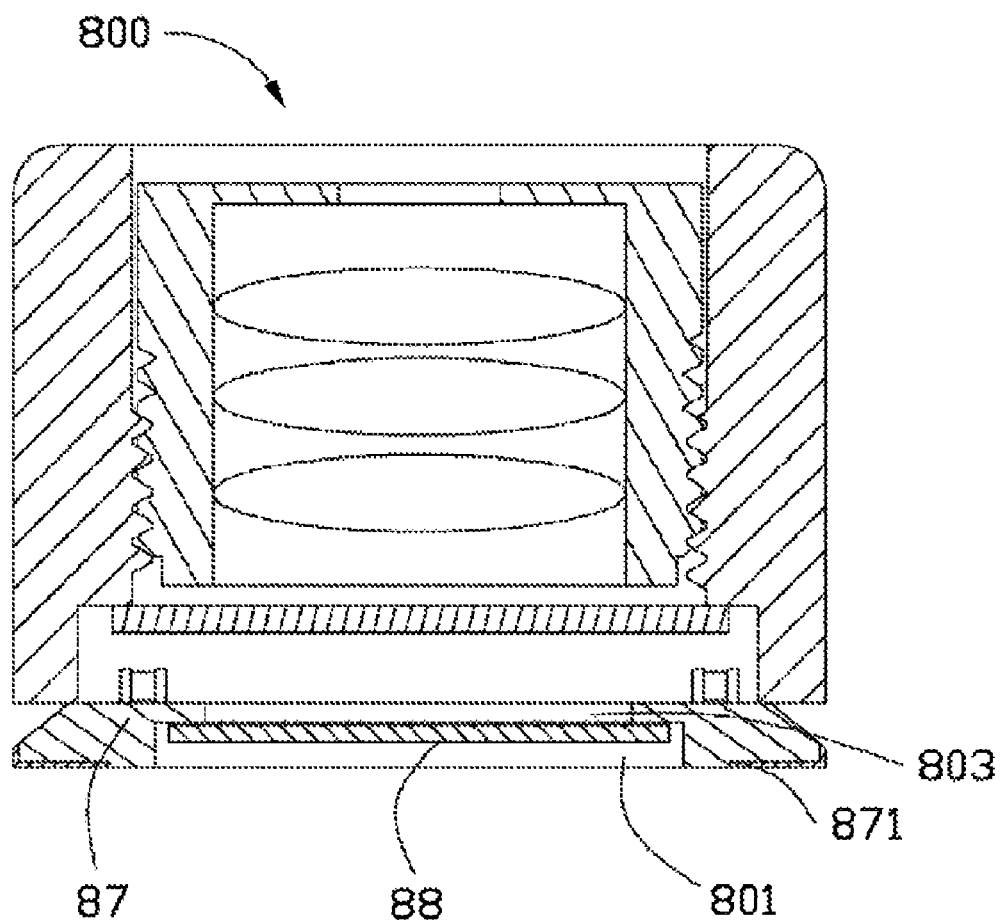
FIG. 5 is a cross section of a fourth embodiment of a camera module.

FIG. 5 shows a fourth embodiment of a camera module 800, differing from the second embodiment of the camera module 600 only in the inclusion of a dividing chamber 803 defined on the baseboard 87 and contact sheets 871 at corners of the baseboard 87, making the camera module 800 a side contact type. The image sensor 88 is positioned in a receiving chamber 801, dividing the receiving chamber 801 and a dividing chamber 803.

Figure 6:
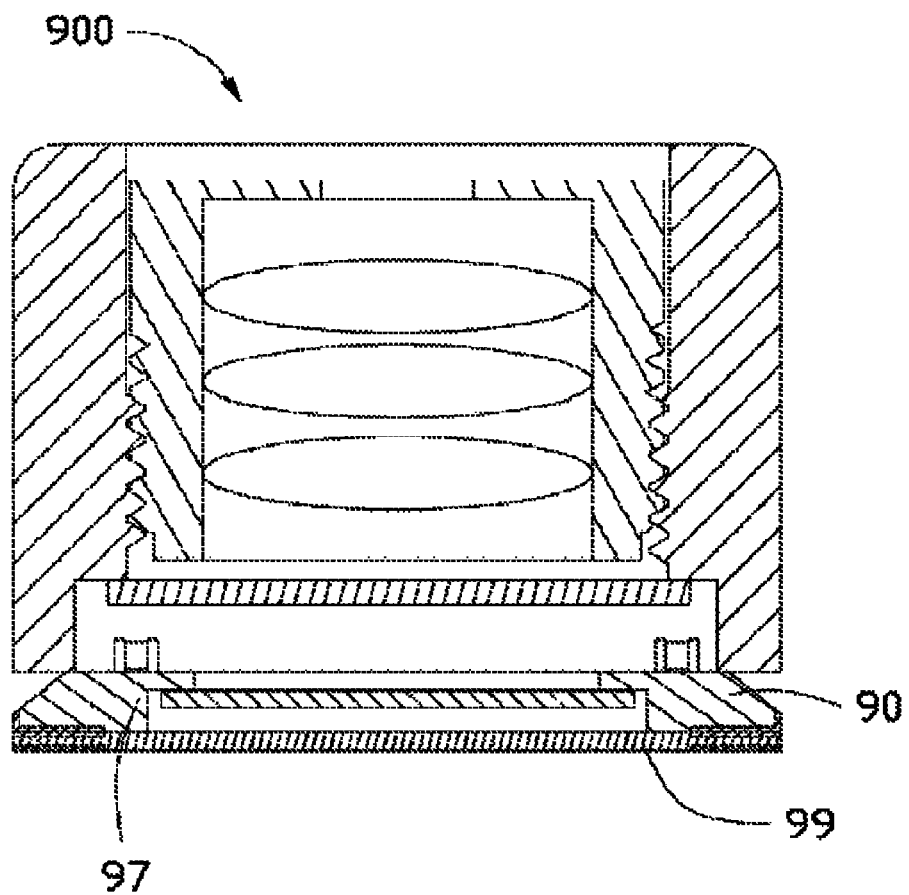
FIG. 6 is a cross section of a fifth embodiment of a camera module.

FIG. 6 shows a fifth embodiment of a camera module 900, differing from the fourth embodiment of the camera module 800 only the inclusion of an additional circuit board 99 electrically connected to the baseboard 97 and the position of the contact sheet (not labeled), making the camera module 900 a bottom contact type.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A camera module comprising:
   a lens assembly comprising a lens, a barrel receiving the lens, and a support member receiving the barrel; and
   a baseboard assembly mounted on the lens assembly comprising a baseboard and an image sensor on the baseboard, wherein the baseboard defines an angled friction surface at a side surface;
   wherein the camera module further comprises a display device, the baseboard assembly comprises a contact sheet on a surface of the baseboard away from the image sensor, and the contact sheet is connected to the display device.

2. The camera module of claim 1, wherein a width of the baseboard decreases toward the image sensor.

3. The camera module of claim 1, wherein the barrel is mounted in the support member by threaded engagement.

4. The camera module of claim 1, wherein the baseboard defines a receiving chamber, and the image sensor is mounted in the receiving chamber.

5. The camera module of claim 1, wherein the baseboard defines a receiving chamber, and the camera module further comprises an electrical member and an integrated circuit in the receiving chamber.

6. The camera module of claim 4, wherein the baseboard further defines a dividing chamber, and the image sensor divides the receiving chamber and the dividing chamber.

7. A method for assembling a camera module, comprising:
   providing a camera module comprising a lens, a barrel receiving the lens, and a support member receiving the barrel;
   providing a baseboard assembly comprising a baseboard and an image sensor on the baseboard receiving optical signals from the lens and converting the optical signals into electrical signals, the baseboard defining an angled friction surface at a side surface;
   providing a contact assembly supporting the baseboard, the contact assembly comprising a circuit board and a probe moveably positioned on the circuit board;
   providing a moveable fixture comprising a first clamping member holding the support member defining a clamping surface corresponding to the friction surface of the baseboard and a second clamping member holding the support member;
   providing a display device connected to the contact assembly and converting the optical signals into an image;
   holding and moving the baseboard assembly on the contact assembly, the probe being connected to the baseboard for transmitting the electrical signals to the display device;
   moving the lens assembly on the baseboard assembly by the second clamping member and adjusting a position of the lens assembly relative to the baseboard according to an image quality; and
   mounting the baseboard on the lens assembly.

8. The method of claim 7, wherein the baseboard is mounted on the lens assembly by surface mount technology.

9. The method of claim 7, wherein the probe comprises a sleeve, a probe head moveably mounted in the sleeve and a spring in the sleeve resisting the probe head, so that the probe head is capable of electrically connecting to the baseboard.

10. The method of claim 9, wherein the baseboard assembly further comprises a contact sheet at a surface of the baseboard away from the image sensor contacting with the probe.

* * * * *